United States Patent [19]

Mikofalvy et al.

[11] 4,286,081

[45] Aug. 25, 1981

[54] ELECTROLYTE IN THE EMULSION POLYMERIZATION PROCESS FOR PRODUCING VINYL DISPERSION RESINS

[75] Inventors: Bela K. Mikofalvy, Avon Lake; James W. Turner, Bay Village, both of Ohio

[73] Assignee: The BF Goodrich Company, Akron, Ohio

[21] Appl. No.: 105,694

[22] Filed: Dec. 20, 1979

Related U.S. Application Data

[63] Continuation-in-part of Ser. No. 84,849, Oct. 15, 1979, abandoned, which is a continuation of Ser. No. 955,817, Oct. 30, 1978, abandoned.

[51] Int. Cl.$^3$ .............................................. C08F 14/06
[52] U.S. Cl. ..................................... 526/74; 526/212; 526/213; 526/215; 526/225; 526/330; 526/344.2
[58] Field of Search ......................................... 526/74

[56] References Cited

U.S. PATENT DOCUMENTS 4,076,920   2/1978   Mikofalvy et al. ................... 526/74

*Primary Examiner*—Harry Wong, Jr.
*Attorney, Agent, or Firm*—Roy P. Wymbs

[57] ABSTRACT

There is disclosed a process for preparing vinyl dispersion resins by conducting the polymerization reaction of the vinyl monomer or monomers in an aqueous alkaline medium, using an oil-soluble polymerization initiator, at low temperatures, in the presence of an emulsifier and, optionally, at least one long straight chain alcohol containing from 14 to 24 carbon atoms, and in the presence of an electrolyte, such as for example, ammonium carbonate (($NH_4)_2CO_3$), and wherein the reaction ingredients are thoroughly mixed, or homogenized, prior to polymerization. The aqueous emulsion of the polymer(s) so produced are capable of being dried into friable aggregates of individual spheres of polymer particles. The dried resin can easily be formulated into plastisols of high North Fineness and high gloss. In addition, polymer buildup in the reactor is reduced.

23 Claims, No Drawings

ELECTROLYTE IN THE EMULSION POLYMERIZATION PROCESS FOR PRODUCING VINYL DISPERSION RESINS

REFERENCE TO RELATED APPLICATION

This application is a continuation-in-part of Ser. No. 084,849, filed Oct. 15, 1979, now abandoned which is a Continuation of Ser. No. 955,817, filed Oct. 30, 1978, now abandoned.

BACKGROUND OF THE INVENTION

It is well known that vinyl resins may be plasticized or changed from the hard, horny and stiff state to a soft, plastic workable condition by the addition thereto, at elevated temperatures, of certain plasticizers, such as dioctyl phthalate, and the like. These vinyl polymers or resins are referred to as dispersion resins or paste resins and are usually made employing an aqueous emulsion polymerization technique. In some cases, a suspension polymerization process has been used, but emulsion polymerization is preferred.

When the vinyl dispersion resin is mixed or blended with a plasticizer, it is referred to as a "plastisol". By virtue of the flowability of the plastisol, it can be processed into various useful products. For example, the plastisols can be used in making molded products, films, coatings, and the like. Accordingly, the vinyl dispersion resin must be capable of being mixed with the plasticizers easily and uniformly to form low viscosity plastisols which are stable, containing particles of uniform and proper size, and capable of producing films, and like products, of good clarity.

With the customary emulsion polymerization processes, suitable latices have been difficult to obtain since the latices usually contain particles of varying size and are either too fine or too large. Various proposals have heretofore been made to overcome these difficulties but not with the ultimate success desired. For example, the use of various different emulsifiers and catalysts have been proposed. Also, varying the conditions of polymerization has been suggested. However, in most of these cases, too much coagulation occurred with the resulting latex containing too much coagulum or partially agglomerated particles which precipitate reducing the yield. Further, the shelf life of such latices leave much to be desired. It is desirable to have latices which change very little during storage with respect to viscosity and have and maintain good heat stability.

In U.S. Pat. No. 4,076,920, issued Feb. 28, 1978, a process for preparing vinyl dispersion resins is disclosed and claimed which produces polymers having unique properties for certain end uses. However, here, as in other prior art processes, it is necessary to spray dry the latex or polymer emulsion resulting in aggregates of the polymer particles which requires grinding to break them up into a size capable of being used in plastisols. As a result of the crushing and grinding required to reduce the polymer to a size capable of being used in plastisols and, also because of the varying sizes and irregular shapes of the ground fragments, the plastisols produced from them have high viscosities relative to their solids content. Further, the excessive grinding required develops excessive heat which tends to fuse the polymer.

As opposed to "pearl" or suspension polymerization, where the polymer particles are large enough to be filtered, vinyl dispersion resins cannot be recovered from the water emulsions by filtration and tray drying because they go through the filters and also because the small particles pack tightly together during tray drying forming "cake" that even after grinding remains hard to formulate into smooth plastisols making it practically useless for most commercial operations. The particles of polymer to be used in a plastisol should preferably be spherical in shape to present as small a particle surface as possible for minimum solvation. Also, a dispersion of spheres provides the lowest flow viscosity for charging molds, coating and like operations (See U.S. Pat. No. 3,179,646, issued Apr. 20, 1965).

Another problem in making vinyl dispersion resins is the formation of undesirable polymer buildup on the inner surfaces of the reactor. This deposit or buildup of polymer on said reactor surfaces not only interferes with heat transfer, but also decreases productivity and adversely affects polymer quality, such as producing finer particles than desired with the resultant adverse effect on viscosity. Obviously, this polymer buildup must be removed, with its attendant difficulties. It would be most desirous to prevent or substantially eliminate polymer buildup in the first instance.

SUMMARY OF THE INVENTION

We have unexpectedly found that when the emulsion polymerization of vinyl dispersion resins is conducted in the presence of an electrolyte, such as, for example, the "fugitive" ammonium carbonate (($NH_4$)$_2CO_3$), which evaporates during drying, the resulting aqueous polymer emulsion can be dried into friable aggregates of individual spheres of polymer particles which can be separated into individual spherical polymer particles by simple light rubbing or crushing. In the process of the present invention, wherein various drying methods are employed, in addition to the electrolyte, the polymerization reaction of the vinyl monomer or monomers is conducted in an aqueous alkaline medium using a free radical yielding polymerization initiator, at a temperature in the range of about 30° C., and about 70° C., in the presence of an emulsifier and, optionally, at least one long straight chain alcohol containing from 14 to 24 carbon atoms, wherein the ratio of alcohol to emulsifier is equal to or greater than 1.0, and wherein the reaction ingredients are thoroughly mixed, or homogenized, prior to polymerization. When employing the process of the invention, the polymer buildup in the reactor is reduced and multiple polymerizations can be run in the reactor without opening the same thereby substantially reducing the amount of unreacted monomer in the surrounding atmosphere.

DETAILED DESCRIPTION

In the present invention, "vinyl dispersion resin" refers to polymers and copolymers of vinyl and vinylidene halides such as vinyl chloride, vinylidene chloride, and the like. The vinyl halides and vinylidene halides may be copolymerized with each other or with one or more polymerizable olefinic monomers having at least one terminal $CH_2\!=\!C\!<$ grouping. As examples of such olefinic monomers there may be mentioned the α,β-olefinically unsaturated carboxylic acids, such as acrylic acid, methacrylic acid, α-cyanoacrylic acid, and the like; esters of acrylic acids, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles such as acrylonitrile and methacrylontrile; acrylamides, such as methyl acrylamide, N-methylol acrylamide, N-butoxyl methacrylamide, and the like; vinyl ethers, such as ethyl vinyl ether, chloroethyl vinyl ether, and the like; the vinyl ketones; styrene and styrene derivatives including α-methyl styrene, vinyl toluene, chlorostyrene, and the like; vinyl naphtahalene, allyl and vinyl chloroacetate, vinyl acetate, vinyl pyridine, methyl vinyl ketone, and other olefinic monomers of the types known to those skilled in the art. The present invention is particularly applicable to the manufacture of vinyl dispersion resins or pastes made by the polymerization of vinyl chloride or vinylidene chloride alone or in admixture with one or more polymerizable olefinic monomers compolymerizable therewith in amounts as great as about 80% by weight, based on the weight of the monomer mixture. The most preferred vinyl dispersion resin is polyvinyl chloride (PVC) and the invention, for simplicity and convenience, will be described in connection therewith, it being understood that this is merely intended in an illustrative and not a limitative sense.

The important aspect of the instant invention is the provision of a process for producing vinyl dispersion resins wherein, after the formulation of the polymer latex or aqueous polymer emulsion, the same can be dried into friable aggregates of individual spheres of polymer particles by simple tray drying, and the like. This eliminates the troublesome spray drying and grinding which very often results in undesirable polymer quality. The inventive concept which enables one to dry the polymer emulsion by other than spray drying, is in the use of an electrolyte in the polymerization recipe. In fact, more than one electrolyte may be employed but, depending upon the emulsifier being used, at least one electrolyte should be partially fugitive, that is, produce a gas during the drying step, such as, for example, the carbonates. The electrolytes useful in the present invention are various salts, such as, for example, ammonium carbonate, calcium chloride, calcium carbonate, the carbonates, bicarbonates, phosphates, citrates and oxalates of sodium, ammonium, potassium, zinc, cadmium, calcium, and barium, and the like. The amount of electrolyte(s) suitable for use in the present invention will vary from about 0.05% to about 6.0% by weight, based on the weight of the monomer or monomers being polymerized. Preferably an amount in the range of about 0.1% to about 2.0% by weight is employed.

The friable aggregates resulting from the process of the instant invention representa a distinct advantage or improvement over prior known means for recovering vinyl dispersion or paste resins from the water for use in plastisols, for example, spray drying and subsequent grinding. The friable aggregates of the present process can easily be handled in the post polymerization stages of polymer or resin recovery. The friable aggregates are easily formed and the individual spherical particles of the vinyl dispersion resins, of a size required for paste resins, are easily formed by crushing, simple grinding or rubbing of said aggregates. Usually, the individual spherical particles of polymer will have a size or diameter in the range of 0.1 micron to about 10.0 microns. For most of the commercial uses of plastisols today, it is preferred to have polymer particles in the range of 2.0 micron to 2.0 microns.

Suprisingly, there are other pluses in the use of the electrolytes in the emulsion polymerization process besides the ability to use drying methods other than spray drying and get an improved quality product. For example, when employing the electrolyte in the polymerization recipe the rate of conversion of monomer(s) to polymer is increased resulting in an overall decrease in the time for complete polymerization which in turn results in increased production per unit of time thereby reducing the cost of making vinyl dispersion resins when using the present process.

Another surprising feature of the present invention is that polymer buildup on the internal surfaces of the reactor is reduced. While it is not known precisely why such reduction in buildup occurs, it is believed to be due in part not only to the presence of the electrolyte in the recipe, but also to the speed of the reaction and the lower reaction temperatures, since it is known that the higher the temperature of reaction for prolonged periods of time increases the liklihood of excessive polymer buildup. In any event, the polymer buildup problem is greatly improved when using the present invention. Further, when employing the present process, the vinyl dispersion resin and the plastisol application properties, such as heat stability, water resistance, flow properties, and the like, are not adversely effected and in fact, if anything, they are improved.

When making vinyl dispersion resins by the emulsion polymerization procedure it is necessary to employ a proper emulsifier or emulsifier system. For example, various fatty acid salts may be employed such as sodium, ammonium, potassium, and the like, as well as the sulfate and sulfonate type soaps of from $C_{12}$ to $C_{20}$ alkyl or aryl hydrocarbons, or various combinations thereof. The saturated fatty acids which are useful may be either natural or synthetic and should contain from 8 to 20 carbon atoms. As examples of such acids there may be named lauric, myristic, palmitic, marganic, stearic, and the like, beef tallow, coconut oil, and the like. The useful sulfate or sulfonate type soaps are those having the general formula:

$$CH_3(C_nH_{2n})-X$$

wherein n is an integer from 7 to 17, and X is selected from

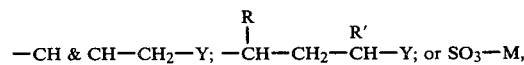

wherein R is H, OH, or an alkyl group having from 1 to 4 carbon atoms; $R^1$ is H, or an alkyl group having from 1 to 4 carbon atoms; Y is

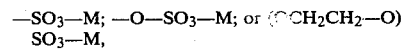

wherein M is selected from $NV_4$, Na, and K, and m is an integer from 7 to 17. As examples of the soaps having the above formula there may be named sodium lauryl sulfate, sodium lauryl ether sulfate, sodium dodecylbenzene sulfonate, sodium alkyl sulfonates, sodium hydroxy sulfonates, sodium alkenyl sulfonates, as well as the ammonium and potassium salts, and the like. The emulsifier is employed in an amount in the range of about 0.5% to about 4.0% by weight based on the weight of the monomer or monomers being polymerized. One can also use mixtures of the emulsifiers in the emulsifier system.

When the ammonium salts of the fatty acids are used, they can be made by mixing the fatty acid and then adding the same to the polymerization medium or polymerization premix in the usual fashion. However, it is preferred to form the ammonium salt in situ, that is, by adding the fatty acid and ammonium hydroxide separately to the polymerization mixture or medium wherein they react to form the salt. An excess of ammonium hydroxide, over that necessary to react with the fatty acid, should be employed in order to maintain the reaction medium on the alkaline side.

In the present invention, it is often desirable to employ a long straight chain saturated alcohol in combination with the emulsifier(s), said alcohol being one containing from 14 to 24 carbon atoms. Examples of such alcohols are tetradecanol, pentadecanol, hexadecanol, heptadecanol, octadecanol, nonadecanol, eicosanol, heneicosanol, tricosanol, and tetracosanol. Mixtures of the alcohols can also be employed and in many cases an alcohol mixture is preferred, such as, for example, a mixture of a 14 carbon alcohol and an 18 carbon alcohol. Also, lower carbon content alcohols can be employed when mixed with the longer chain alcohols, such as a mixture of dodecanol and octadecanol. When employing an alcohol, the ratio of alcohol to the emulsifier(s) of 1.0 can be used. However, the best results are obtained when said ratio is greater than 1.0.

As pointed out above, the reaction medium should be maintained on the alkaline side, and preferably at a high pH. The present process can be conducted at a pH in the range of about 7.0 to about 12.0. However, it is preferred to operate in a pH range of about 8.0 to about 10.5. If the pH is too high it takes too much NH$_4$OH and if the pH is too low, for example, below 7.0, the polymer buildup in the reactor increases and the coagulum increases. The amount of NH$_4$OH needed to properly adjust the pH will depend in part on the particular emulsifier system being used in the reaction mixture. Of course, other alkaline agents may be employed to adjust the pH of the reaction mixture, such as NaOH, KOH, etc. The choice of a particular alkaline agent depends upon the ingredients in the reaction medium.

The process of the present invention, wherein an electrolyte is employed in the reaction mixture and the product, for example, is tray dried, is conducted at a pH in the range of about 7.0 to about 12.0. However, it is preferred to operate in a pH range of about 8.0 to about 10.5. If the pH is too high it takes too much NH$_4$OH and if the pH is too low, for example, below 7.0, the polymer buildup in the reactor increases and the coagulum increases. The amount of NH$_4$OH needed to properly adjust the pH will depend in part on the particular emulsifier system being used in the reaction mixture. Of course, other alkaline agents may be employed to adjust the pH of the reaction mixture, such as NaOH, KOH, etc. The choice of a particular alkaline agent depends upon the ingredients in the reaction medium.

The process of the present invention, wherein an electrolyte is employed in the reaction mixture and the product, for example, is tray dried, is conducted in the presence of a compound or compounds capable of initiating the polymerization reaction. Free radical yielding initiators, normally used for polymerizing olefinically unsaturated monomers, are satisfactory. The useful initiators or catalysts include, for example, the various peroxygen compounds, such as lauryl peroxide, isopropyl peroxydicarbonate, benzoyl perioxide, t-butyl hydroperoxide, t-butyl peroxypivalate, cumene hydroperoxide, t-butyl diperphthalate, pelargonyl peroxide, 1-hydroxycyclohexyl hydroperoxide, and the like; azo compounds such as azodiisobutyronitrile, dimethylazodiisobutyrate, and the like. Also, useful initiators are the water-soluble peroxygen compounds, such as hydrogen peroxide, persulfates, such as potassium persulfate, ammonium persulfate, and the like. The amount of initiator used will generally be in the range of from about 0.01% to about 0.5% by weight, based on the weight of the monomer or monomers being polymerized, and preferably from about 0.02% to about 0.1% by weight.

In the present process, the initiator may be charged completely at the outset of the polymerization or it may be added incrementally to the reactor during the course of the polymerization reaction. However, it is preferred to charge the initiator at the outset by adding it to the monomer premix with the other ingredients of the reaction mixture. This is advantageous when said premix is homogenized prior to introduction into the reactor. When adding the initiator to the monomer premix and then thoroughly mixing with high speed agitation or stirring, or when homogenizing the premix, such as when an alcohol(s) is employed in the reaction mixture, it is necessary to keep the temperature below the minimum temperature of reactivity of the particular initiator or initiators being employed. This minimum temperature of reactivity of any one initiator is readily determinable by one skilled in the art and very often, is supplied by the initiator or catalyst manufacturer. After introduction of the monomer premix into the reactor, the temperature is adjusted to that at which the reaction is to take place.

The temperature of reaction of the instant emulsion polymerization process is important since the inherent viscosity (IV) of the resultant vinyl dispersion resin is a direct function of the temperature of reaction. That is the higher the temperature the lower the IV. Accordingly, the end use for the vinyl dispersion resin to be produced will normally dictate the reaction temperature. For example, when producing vinyl dispersion resins to be used in coatings or in casting flexible films, a lower temperature will be employed in order to attain a higher IV which is desirable for many coating applications and film-forming operations. We have found that for the end uses to which the vinyl dispersion resins of this invention are particularly adapted, polymerization temperatures in the range of about 30° C. to about 70° C. are satisfactory. However, it is preferred to employ a temperature in the range of about 30° C. to about 55° C.

Another factor, which must be considered with respect to the temperature of the reaction, is that of polymer buildup in the reactor. In general, as the temperature of reaction is increased, the polymer buildup in the reactor increases. However, the polymer buildup is not of the hard crusty type and can be removed by rinsing or hosing down with water and without opening the reactor when appropriate spray nozzles are installed in the reactor. On the other hand, even this buildup is controlled and reduced by the presence of the electrolyte in the reaction medium. In combination with the electrolyte, the walls of the reactor are kept cool during the polymerization reaction, especially during the early stages of the reaction when most of the buildup, if any, forms. The regulation of the temperature of the reaction can be accomplished by normal means, such as employing a jacketed reactor with circulating cool water or other liquid in the jacket. It is believed that a synergistic effect results from the use of the electrolyte with a cooled reaction medium in the early stages of the reaction cycle since polymer buildup is reduced. Repeated cycles can be run without cleaning the inner surfaces of the reactor between charges or cycles thus increasing the efficiency of the process and reducing the cost of producing vinyl dispersion resins having a wider scope of end uses.

Upon completion of the polymerization reaction, the vinyl dispersion resin is isolated in powder form, that is, in the form of discrete spherical polymer particles. This is accomplished by filtering the latex from the polymerization reactor in order to recover the friable aggregates of polymer, drying the filtered latex at a temperature in the range of about 23° C. to about 100° C. under atmospheric pressure during the course of which the electrolyte comes off. The drying temperature can be lower or higher than the limits of said range of temperature depending upon whether or not the drying step takes place under a vacuum or under positive pressure. The time of the drying step will depend upon the particular polymer being dried. However, the drying should continue until the water content of the polymer is about 0.1% by weight or lower. The time, of course, will vary with the temperature being employed. The important thing is not to subject the polymer to prolonged heating at elevated temperatures since such heating may deleteriously affect the quality of the polymer, such as discoloration, etc. After drying, the friable aggregates of individual spheres of polymer particles that are found are crushed lightly or rubbed to separate the individual spheres and the dried polymer or resin is recovered in powder form. The powdered resin is then ready to be made into plastisols. It should be pointed out that the forms or methods of drying that may be used, are, for example, tray drying, rotary dryers, air jet dryer, fluid bed dryer, continuous belt drying, pressure drying, etc., so long as spray drying is not employed.

Plastisols are made with the vinyl dispersion resins of the present invention by uniformly blending or intimately mixing, by conventional means using heat and agitation, with 100 parts by weight of the vinyl dispersion resin in the form of discrete spherical polymer particles, from about 30 to about 100 parts by weight of one or more plasticizers. The useful plasticizers may be described as the alkyl and alkoxy alkyl esters of dicarboxylic acids or the esters of a polyhydric alcohol and a monobasic acid. As examples of such plasticizers, there may be named dibutyl phthalate, dioctyl phthalate, dibutyl sebacate, dinonyl phthalate, di(2-ethyl hexyl) phthalate, di(2-ethyl hexyl) adipate, dilauryl phthalate, dimethyl tetrachlorophthalate, butyl phthalyl butyl glycollate, glyceryl stearate, and the like. The preferred plasticizers are the liquid diesters of aliphatic alcohols having from 4 to 20 carbon atoms and di-basic carboxylic acids having from 6 to 14 carbon atoms.

The plastisols made from the vinyl dispersion resins of the present invention should have the desired yield and preferably with little or no dilatency. Yield is simply defined as resistance to flow and is normally determined numerically through viscosity measurements employing well known standard techniques. Normally such values are arrived at by calculation from viscosity measurements using a Brookfield Model RVF Viscometer according to ASTM method D1824-61T. Yield is determined from viscosity measurements of the plastisols at varying r.p.m.'s (revolutions per minute) after initial preparation and at intervals of aging. The viscosity is measured in centipoises (cps.) at a temperature of 23° C. In the specific examples, that follow hereinafter, viscosity measurements were made at 2 rpm. and 20 rpm. and are expressed as $V_2$ and $V_{20}$ respectively.

To further illustrate the present invention, the following specific examples are given, it being understood that this is merely intended in an illustrative and not a limitative sense. In the examples all parts and percents are by weight unless otherwise indicated.

EXAMPLE I

In this Example, a series of runs were made to show the various aspects of the present invention. The recipes used and the conditions of reaction are set forth in the table which follows. In the table, all figures are in parts by weight based on the weight of the total composition.

TABLE NO. I

| RUN NO. | 1 (Control) | 2 | 3 | 4 | 5 |
|---|---|---|---|---|---|
| Vinyl chloride | 100.0 | 100.0 | 100.0 | 100.0 | 100.0 |
| Alcohol $C_{12}$ + $C_{18}$ | — | 2.1 | 2.1 | — | — |
| Lauric Acid | — | — | 2.0 | 0.2 | 0.8 |
| $NH_4OH$ | — | — | 0.244 | 0.13 | 0.52 |
| Sodium lauryl sulfate | — | 0.9 | — | — | 0.0025 |
| Ammonium laurate | 0.6 | — | — | — | — |
| Sodium laurate | 0.26 | — | — | — | — |
| Tert butyl peroxypivolate | — | — | 0.05 | — | — |
| Di-isopropyl peroxydicarbonate | — | 0.03 | — | — | — |
| Potassium persulfate | 0.0247 | — | — | 0.01 | 0.02 |
| Sodium meta-bisulfite | — | — | — | 0.0015 | 0.003 |
| Ammonium carbonate | — | — | — | 0.3 | — |
| Calcium carbonate | — | 0.2 | 0.2 | — | — |
| Seed (PVC) | 40.0 | — | — | 3.0 | — |
| Water (DM) | 115.0 | 100.0 | 100.0 | 225.0 | 225.0 |
| Temperature | 49.5° C. | 45° C. | 45° C. | 40° C.–35° C. | 40° C.–35° C. |
| Homogenized | NO | YES | YES | NO | NO |
| Emulsifier addition | Proportion during reaction | BATCH | BATCH | Proportion during reaction | Proportion during reaction |

In runs 2 and 3 above, where alcohols were employed in recipes, a monomer premix tank or vessel was evacuated. The premix tank was first charged with the water and then, under agitation, the electrolyte was added followed by the emulsifier and then the alcohol mixture. The catalyst was added next, and lastly, the vinyl chloride. The temperature in the premix tank was controlled at about 25° C., by means of a cooling jacket. The mixture was agitated for about 15 minutes. Thereafter, the mixture, or monomer premix was passed through a Mantin Ganlin 2 stage homogenizer at a temperature of 25° C. into the polymerization reactor which had previously been evacuated. The pressure in the first stage of the homogenizer was 600 psig. and in the second stage was 700 psig. The contents of the reactor were then heated to the reaction temperature of 45° C. and held there throughout the reaction until the desired conversion was obtained. The reactor was then cooled, vented and the polyvinyl chloride (PVC) latex or slurry was removed and dried. Pertinent data is given the Table II below.

In runs 1, 4 and 5 the ingredients were added to and mixed in the polymerization reactor. Further, the emulsifier was proportioned into the reactor during the course of the reaction. In the case of runs 1 and 4, a PVC seed was added to the reactor on which the vinyl chloride was overpolymerized to obtain a larger particle size. In the case of run 5, however, a small amount of emulsifier (sodium lauryl sulfate) was added initially in place of the seed (PVC). In the case of runs 4 and 5, the temperature of the reaction mixture was held at 40° C. until about 58% to 60% conversion was reached and then the temperature was reduced to 35° C. and held there until the reaction was complete. Thereafter, in each case, the reactor was cooled, vented and PVC latex or slurry was removed and dried.

In order to determine the Brookfield Viscosity, plastisols were made with the resin or PVC of each run using the following recipe:

| | |
|---|---|
| PVC | 100 parts |
| Dioctyl phthalate | 40 parts |
| Dioctyl adipate | 30 parts |
| Epoxidized soybean oil | 3 parts |
| Barium-Cadmium-Zinc Phosphite | 2 parts |

The data with respect to viscosity is recorded in the following Table II.

TABLE NO. II

| RUN NO. | 1 | 2 | 3 | 4 | 5 |
|---|---|---|---|---|---|
| Electrolyte-Type | (Control) None | CaCO$_3$ | CaCO$_3$ | (NH$_4$)$_2$CO$_3$ | None |
| Level (Parts) | — | 0.2 | 0.2 | — | — |
| Slurry Viscosity | <10 | 8.6 | Liquid | Whipped Cream | 5.0 |
| Dry Cake Break-Up (Tray dried) | Hard Cake | Good | Fair | Excellent | Poor |
| Plastisol Properties | | | | | |
| Type of Drying of Slurry | Spray | Spray | Spray | Tray | Spray |
| Brookfield Viscosity (cps) | | | | | |
| Initial V$_2$ | 9,400 | 20,400 | 4,300 | 1,850 | Not Measured. |
| V$_{20}$ | 40,400 | 1,100 | 4,880 | 1,890 | |
| 1 Day V$_2$ | 31,500 | 38,500 | 55,000 | 2,200 | |
| V$_{20}$ | 23,700 | 17,500 | 29,800 | 2,210 | |

As can be seen from the above results, the use of an electrolyte permits tray drying to give good dry cake break-up and superior plastisol properties.

EXAMPLE II

In this Example, a series of runs were made to show the effect of varying the concentration of the electrolyte. The same polymerization procedure as in Example I was employed with the exception that homogenization was not used. The plastisols were also made as in Example I. The results are in the following table:

TABLE NO. III

| RUN NO. | 6 | 7 | 8 | 9 | 10 | 11 | 12 |
|---|---|---|---|---|---|---|---|
| Electrolyte Type | (NH$_4$)$_2$CO | Na$_2$CO$_3$ | (NH$_4$)$_2$CO$_3$ | (NH$_4$)$_2$CO$_3$ | (NH$_4$)$_2$CO$_3$ | (NH$_4$)$_2$CO$_3$ | (NH$_4$)$_2$ |
| Level (pts) | 0.3 | 0.4 | 1.0 | 0.75 | 0.5 | 0.4 | 0.2 |
| Emulsifier Type | NH$_4$ Laurate | NH$_4$ Laurate | NH$_4$ Laurate | NH$_4$ Laurate | NH$_4$ Laurate | NH$_4$ Laurate | NH$_4$ Laurate |
| Level (pts) | 0.2 | 0.2 | 0.2 | 0.2 | 0.2 | 0.2 | 0.2 |
| Slurry Viscosity (cps) | Whipped | 3.0 | Whipped | Whipped | Whipped | Whipped | 62.5 |
| Dry Cake Break-Up (Tray Dried) | Excellent | Excellent | Excellent | Excellent | Excellent | Excellent | Very G |
| Plastisol Properties | | | | | | | |
| Brookfield Viscosity (cps) | | | | | | | |
| Initial V$_2$ | 1850 | 3200 | 2000 | 1500 | 2200 | 1500 | 700 |
| V$_{20}$ | 1890 | 1900 | 2130 | 1200 | 1570 | 1320 | 700 |
| 1 Day V$_2$ | 2200 | 3280 | 2000 | 1700 | 2600 | 1800 | 800 |
| V$_{20}$ | 2210 | 2280 | 2250 | 1330 | 2100 | 1650 | 750 |

In the above Tables, under Slurry Viscosity, the term "Whipped Cream" is the ideal condition for the slurry or latex. In Table No. III it is noted that the important property of "Dry Cake Break-up" was excellent or very good. The results clearly show the advantage of employing an electrolyte followed by tray drying.

EXAMPLE III

In this Example, several runs were made using different electrolytes. The recipes and conditions of reaction are set forth in the table which follows. In the table, all figures are in parts by weight based on the weight of the total composition.

TABLE NO. IV

| Run No. | 13 | 14 | 15 |
|---|---|---|---|
| Vinyl Chloride | 100 | 100 | 100 |
| Potassium persulfate | 0.02 | 0.04 | 0.04 |
| Lauric acid | 0.2 | 0.2 | 0.2 |
| NH$_4$OH (28%) | 0.13 | 0.13 | 0.13 |
| Water (D.M.) | 225 | 225 | 225 |
| Sodium metabisulfite | 0.0015 | 0.0015 | 0.0015 |
| Seed (PVC) | 3.0 | 3.0 | 3.0 |
| Zinc carbonate | 1.0 | — | — |
| Cadmium carbonate | — | 1.0 | — |
| Barium carbonate | — | — | 2.0 |
| Antistatic agent - polyoxyethylene laurate | 0.1 | 0.1 | 0.1 |
| Temperature | 40°-35° C. | 40°-35° C. | 40°-35° C. |
| pH (average) | 8.5 | 8.8 | 9.0 |
| Emulsifier addition | Proportion | Proportion | Proportion |

The ingredients were added to and mixed in the polymerization reactor in the case of each of the runs. First, the water was added to the reactor and then the potassium persulfate. Thereafter, the PVC seed sodium metabisulfite and electrolyte were charged followed by the vinyl chloride. The emulsifier was prepared prior to charging by mixing the lauric acid and ammonium hydroxide at 50° C., Then the reaction mixture was heated to 40° C. with agitation and when the total solids in the reactor reached 7%, the emulsifier was metered in at the rate of 2.5 lbs./hour. When the conversion of monomer to polymer reached about 58% to 60%, the temperature of the reaction was reduced to 35° C. and held there until the reaction was complete. The completion of the reaction occurred when there was a pressure drop of 20 psig. or about 24 hours. Thereafter, in each run, the reactor was cooled, vented and PVC latex was removed, filtered and tray dried. In each of the runs, the latex, or slurry, viscosity was "whipped cream" which is ideal. More importantly, the dry cake break-up, after tray drying, was excellent in each run.

It can thus be seen from the above description and examples that by employing an electrolyte in the polymerization medium, it is possible to filter and dry emulsion polymerization latices by means other than spray drying with a resultant improvement in properties of the vinyl dispersion resins so produced. More importantly, spray drying and the harsh grinding step attendant thereto, which adversely affects polymer quality, is eliminated by the process of the present invention. Further, the process produces more dispersion resin per unit of time with improved properties and with substantial reduction of polymer buildup on the internal surfaces of the polymerization reactor. These factors all contribute to a low cost vinyl dispersion resin process. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A process for producing polymers of vinyl and vinylidene halides and copolymers thereof with each other or either with up to 80% by weight of one or more polymerizable olefinic monomers having at least one terminal $CH_2\!=\!C\!<$ grouping, comprising forming a monomer premix containing the monomer or monomers to be polymerized, the aqueous reaction medium, from about 0.01% to about 0.5% by weight of a free radical yielding catalyst based on the weight of 100 parts of monomer or monomers being polymerized, from about 0.05% to about 6.0% by weight of at least one fugitive gas producing electrolyte based on the weight of the monomer or monomers, from about 0.5% to about 4.0% by weight based on the weight of the monomer or monomers, of an emulsifier for the polymerization system selected from the group consisting of salts of saturated fatty acids containing from 8 to 20 carbon atoms, sulfate and sulfonate type soaps of from $C_{12}$ to $C_{20}$ alkyl or aryl hydrocarbons, and mixtures of said emulsifiers, mixing said premix at a temperature below the reactivity of the catalyst or catalysts employed, passing said premix to a reaction zone, emulsion polymerizing said premix in said zone at a temperature in the range of about 30° C. to about 70° C., maintaining the pH in the reaction zone in the range of about 7.0 to about 12.0 until the reaction is complete, removing the polymer emulsion from said reaction zone and filtering the same to recover the polymer and friable aggregates of polymer, drying the polymer and friable aggregates of polymer while removing the electrolyte therefrom, and lightly crushing said friable aggregates to form individual spheres of polymer particles, and wherein polymer buildup in said reaction zone is reduced.

2. A process as defined in claim 1 wherein the monomer in the premix is vinyl chloride.

3. A process as defined in claim 1 wherein the premix contains at least one long straight chain saturated alcohol containing from 14 to 24 carbon atoms and wherein the ratio of alcohol to emulsifier is greater than 1.0.

4. A process as defined in claim 3 wherein the premix is homogenized prior to entering the reaction zone.

5. A process as defined in claim 4 wherein the monomer in the premix is vinyl chloride.

6. A process as defined in claim 1 wherein the emulsifier is the ammonium salt of a saturated fatty acid containing from 8 to 20 carbon atoms.

7. A process as defined in claim 6 wherein the fatty acid is lauric acid.

8. A process as defined in claim 1 wherein the electrolyte is ammonium carbonate.

9. A process as defined in claim 1 wherein the catalyst is tert-butyl peroxypivalate.

10. A process as defined in claim 1 wherein the drying is conducted at a temperature in the range of about 23° C. to about 100° C. at atmospheric pressure.

11. A process as defined in claim 1 wherein the catalyst is di-isopropyl peroxydicarbonate.

12. A process as defined in claim 1 wherein the size of the dried individual spheres of polymer particles is in the range of about 0.1 micron to about 10.0 microns.

13. A process as defined in claim 1 wherein the electrolyte is calcium carbonate.

14. A process as defined in claim 1 wherein the emulsifier is sodium lauryl sulfate.

15. A process as defined in claim 1 wherein the premix contains a mixture of $C_{14}$ and $C_{18}$ alcohols.

16. A process as defined in claim 15 wherein the monomer in the premix is vinyl chloride.

17. A process as defined in claim 16 wherein the electrolyte is ammonium carbonate.

18. A process as defined in claim 17 wherein the emulsifier is ammonium laurate.

19. A process as defined in claim 18 wherein the catalyst is tert-butyl peroxypivalate.

20. A process as defined in claim 19 wherein the pH in the reaction zone is maintained in the range of about 8.0 to about 10.5.

21. A process as defined in claim 20 wherein the size of the dried individual spheres of polymer particles is in the range of about 0.2 micron to about 2.0 microns.

22. A process as defined in claim 1 wherein the monomers in the premix are vinyl chloride and vinyl acetate.

23. A process as defined in claim 22 wherein the electrolyte is ammonium carbonate.

* * * * *